United States Patent [19]

McRae

[11] 3,896,015

[45] July 22, 1975

[54] METHOD AND APPARATUS FOR SEPARATING WEAKLY IONIZABLE SUBSTANCES FROM FLUIDS CONTAINING THE SAME

[75] Inventor: Wayne A. McRae, Lexington, Mass.

[73] Assignee: Ionics, Incorporated, Watertown, Mass.

[22] Filed: July 24, 1968

[21] Appl. No.: 747,158

[52] U.S. Cl. .............................. 204/180 P; 204/301
[51] Int. Cl. ....................... B01d 13/02; B01k 1/00
[58] Field of Search ....................... 204/180 P, 301

[56] References Cited
UNITED STATES PATENTS

| 2,799,644 | 7/1957  | Kollsman ........................ 204/180 P |
| 2,860,095 | 11/1958 | Katz et al. ...................... 204/180 P |
| 3,046,211 | 7/1962  | Tye ................................. 204/180 P |
| 3,219,567 | 11/1965 | Lacey ............................. 204/301    |
| 3,330,750 | 7/1967  | McRae et al. .................. 204/180 P |
| 3,433,726 | 3/1969  | Parsi .............................. 204/180 P |

FOREIGN PATENTS OR APPLICATIONS

| 735,415 | 5/1966 | Canada ............................. 204/301 |

Primary Examiner—Benjamin R. Padgett
Assistant Examiner—E. A. Miller
Attorney, Agent, or Firm—Norman E. Saliba

[57] ABSTRACT

This invention is directed to apparatus and methods for separating weakly ionizable substances from mixtures of the same such as carbon dioxide from an enclosed atmosphere. One method employs a four compartment electrolytic cell comprised of end electrodes, a planar anion exchange membrane therebetween, a corrugated cation exchange membrane between and in contact with the anode electrode and the planar membrane and a corrugated anion exchange membrane between and in contact with the cathode electrode and the planar membrane. The projections of each corrugated membrane make point contact with the adjacently placed electrode and planar membrane to form an anode, stripper, scrubber and cathode compartment. In operation the $CO_2$ contaminated air is passed into the scrubber compartment; water is passed through the remaining compartments and a D.C. current is passed between the electrodes to result in the recovery of partially purified air from the scrubber compartment.

13 Claims, 4 Drawing Figures

CM = CATION-TRANSFER MEMBRANE
AM = ANION - TRANSFER MEMBRANE

CM = CATION-TRANSFER MEMBRANE
AM = ANION-TRANSFER MEMBRANE

INVENTOR
WAYNE A. McRAE

METHOD AND APPARATUS FOR SEPARATING WEAKLY IONIZABLE SUBSTANCES FROM FLUIDS CONTAINING THE SAME

This invention relates to methods and apparatus for the removal of partially ionizable substances from fluid mixtures of the same in which the substances are not appreciably ionized. More specifically, it relates, for example, to the removal of carbon dioxide from an enclosed atmospheric air, to the removal of mercaptans, for example, alkyl mercaptans from gasoline, and ammonia or amines from fluid mixtures of the same.

For the purpose of this disclosure, a partially ionizable substance is one which is at least partially soluble in water, the resulting solution containing at least a low concentration of ions derived from said substance. Similarly, a weakly acid substance and a weakly basic substance are defined as substances which dissolve at least partially in liquid water to form a weakly ionized acid and a weakly ionized base, respectively. For the purpose of this disclosure "gas" as used herein includes noncondensible gases as well as condensible vapors, and "fluids" includes gases, and liquids, and mixtures thereof.

The sorption of low molecular weight ionizable substances by liquid or solid sorbing agents is a well-known process in the chemical industry. For example, before natural gas or gasoline are sold to the public, the contaminants such as $CH_3SH$, $H_2S$, $SO_2$, etc., are removed. Air pollution control requires the removal of $H_2S$, $SO_2$, $NO_2$, etc., from waste gas streams. The removal of $CO_2$ from anesthetic vapor gases (after the anesthetic gas has been exhaled by a patient) for purposes of recycle, has assumed importance for economic and safety reasons. The maintenance of a life-supporting atmosphere in a confined, isolated environment, such as a space vehicle, or a submerged submarine, requires the removal of carbon dioxide gas from air or oxygen. Heretofore, logistic considerations made it necessary to employ a sorbing material which was readily regenerable. Generally, carbon dioxide gas was taken up by a solid or liquid sorbing agent and upon exhaustion the latter material was regenerated by heat and/or vacuum to its original state; that is, the sorbed carbon dioxide was removed therefrom. Thus, carbon dioxide may be removed from air, and during regeneration released in concentrated form. Economic considerations require that the sorbing material remain unconsumed during the sorbing or regenerating cycle.

The systems heretofore most generally used for carbon dioxide removal are:

1. Sorption by a caustic hydroxide,
2. Sorption by anhydrous microporous zeolites, and
3. Sorption of carbon dioxide by solutions of alkaline amines.

Other partially water soluble gases such as $H_2S$, $CH_3SH$, $NH_3$ and amines are now removed commercially by processes similar to those mentioned above.

In addition to the sorber systems described above, the prior art also employed ion conducting electrolytic cells wherein activated polyethylene screen impregnated with ion-exchange resin, or ion-exchange resin particles were used as a packing material between ion-exchange membranes (U.S. Pat. No. 3,330,750). These cells were used to remove weakly ionizable substances from mixtures of the same in liquid or gaseous forms. However, these systems were found very unsatisfactory due to high power consumption and generally low cell efficiency.

The present invention overcomes the disadvantages of the prior art processes as noted above in that a four chamber electrolytic cell is employed wherein embossed as, for example, corrugated, ion-exchange membranes of opposite charge type are situated adjacent to the end electrode chambers of the cell, the embossed projections of each of said membranes being in physical contact at their end projections with their adjacent electrodes and with an intermediate ion exchange membrane (which may or may not be embossed) thus forming four fluid flow-paths for interactions within the cell to produce more efficiently and economically the results sought, as will be more fully disclosed in detail hereinafter. The invention also includes alternative but electrochemically equivalent systems wherein any combination of the end electrodes and intermediate membranes are embossed and the bosses are in contact at their end projections with the adjacent membrane or electrode to provide a current path passing solely through electrodes and membranes wherein an equivalent four chamber cell is provided to effect the desired result, as will also be disclosed in detail hereinafter.

Accordingly, one object of the present invention is to provide a novel apparatus and process for separating weakly ionizable substances from fluid mixtures containing the same.

Another object is to employ embossed ion-exchange membranes as an improvement over the use of plastic screens of ion exchange bead packings in the flow paths of the electrolytic cells of the prior art in the separation of weakly ionizable substances from fluid mixtures containing the same.

Another object is to provide a novel method and apparatus for separating and removing carbon dioxide gas from an ambient atmosphere which has been overconcentrated by continual breathing in a confined space, such as a cabin.

Another object is to provide an electrolytic system for the efficient and economical separation and removal of weakly ionizable substances from fluid mixtures containing the same.

A further object of this invention is to provide apparatus and processes for the continuous separation and removal of carbon dioxide gas from an air stream and of mercaptans from petroleum fluids containing the same.

These and other various objects, features and advantages of the invention will appear more fully from the detailed description which follows, accompanied by drawings showing for the purpose of illustration preferred embodiments of the invention. The invention also resides in certain new and original features of construction and combination of elements and the method of carrying out the invention in said disclosed apparatus all of which is hereinafter set forth and claimed.

By way of example, the use of this invention for the removal of gases and, in particular, the removal of carbon dioxide from atmospheric air or ammonia from an air-ammonia gas mixture will be described in detail with reference to the drawings which represent a four compartment unit for the gas phase removal of carbon dioxide or ammonia from an air stream.

Although the characteristic features of the invention which are believed to be novel will be particularly pointed out in the claims appended hereto, the invention itself, its objects and advantages, and the manner in which it may be carried out, may be better understood by referring to the following description taken in connection with the accompanying drawings forming a part of it, in which:

Figure 2:
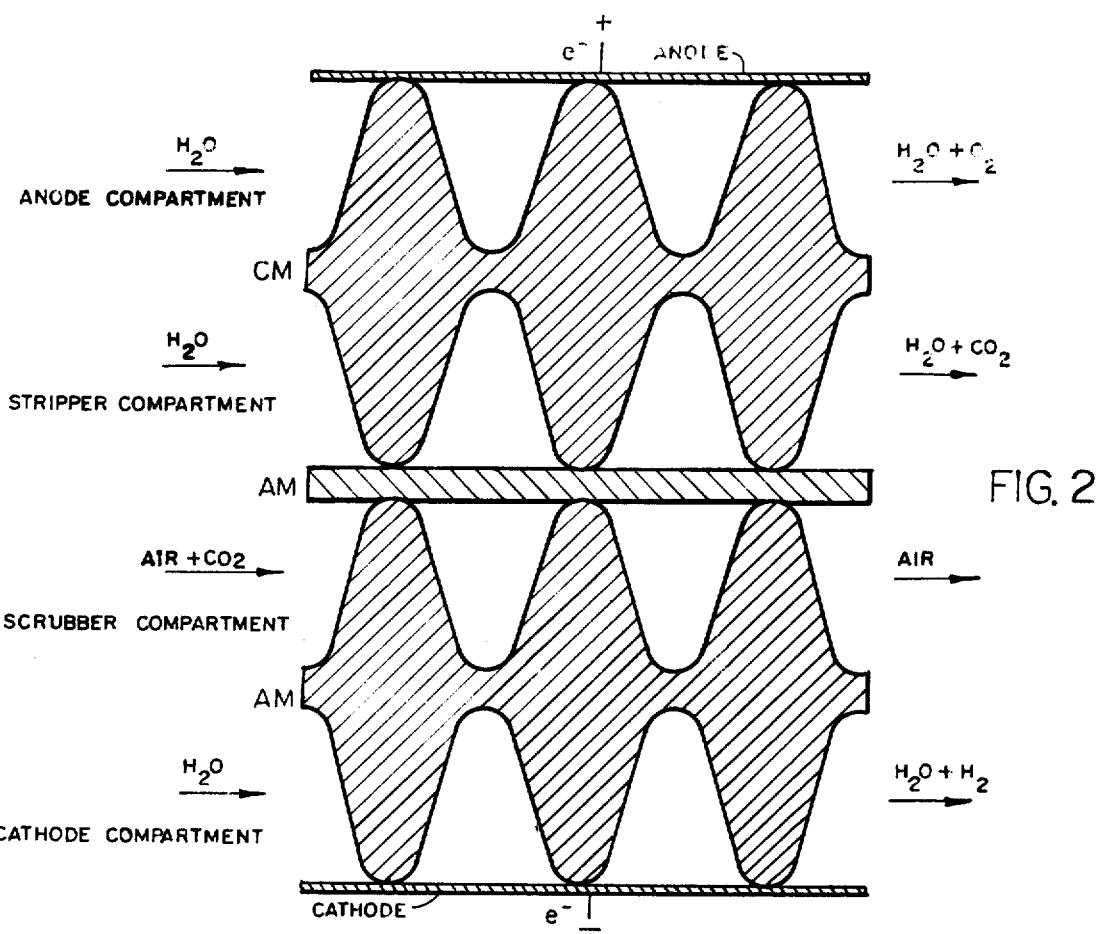
FIG. 2 is an enlarged detailed four chamber cell including the use of embossed ion-exchange membranes whereby four chambers or compartments are clearly defined in the drawing by the indicated elements of the cell unit. The feed and resulting products are clearly demonstrated and conform to the chemical reactions as shown in FIG. 1.
Figure 4:
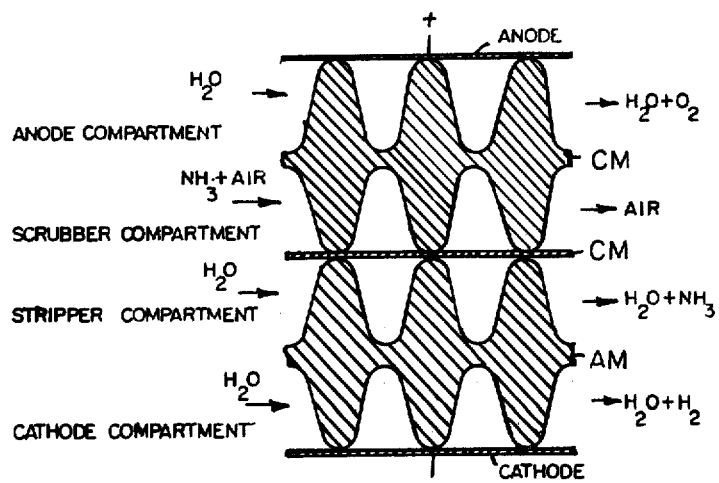

FIG. 4 shows graphically the principles of flow and chemical reactions involved in the scrubbing of a fluid mixture containing the weakly ionizable basic gas ammonia. This figure shows the cell arrangement and chemical reactions which result when a mixture of a weakly ionizable basic gas and a non-conducting fluid ($NH_3$ + air) is scrubbed for removal of the basic gas. It will be noted that the scrubber and stripper compartments are in reverse positions from those employed in the apparatus for removal of an acidic gas ($CO_2$) as shown in FIG. 2. Also, the substantially centrally located planar ion exchange membrane is cationic in place of the anionic planar membrane in the cell of FIG. 2.

Figure 1:
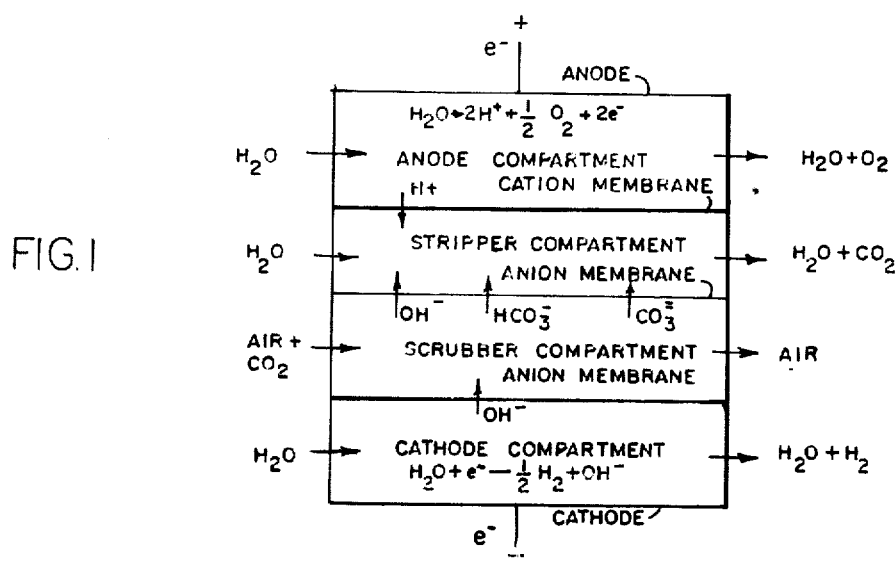
FIG. 1 is self explanatory and shows the basic unit flow diagram including the chemical reactions which take place in each of the four compartments of the cell in the case of removing $CO_2$ from cabin air having an excess quantity of $CO_2$ gas.
Figure 3:
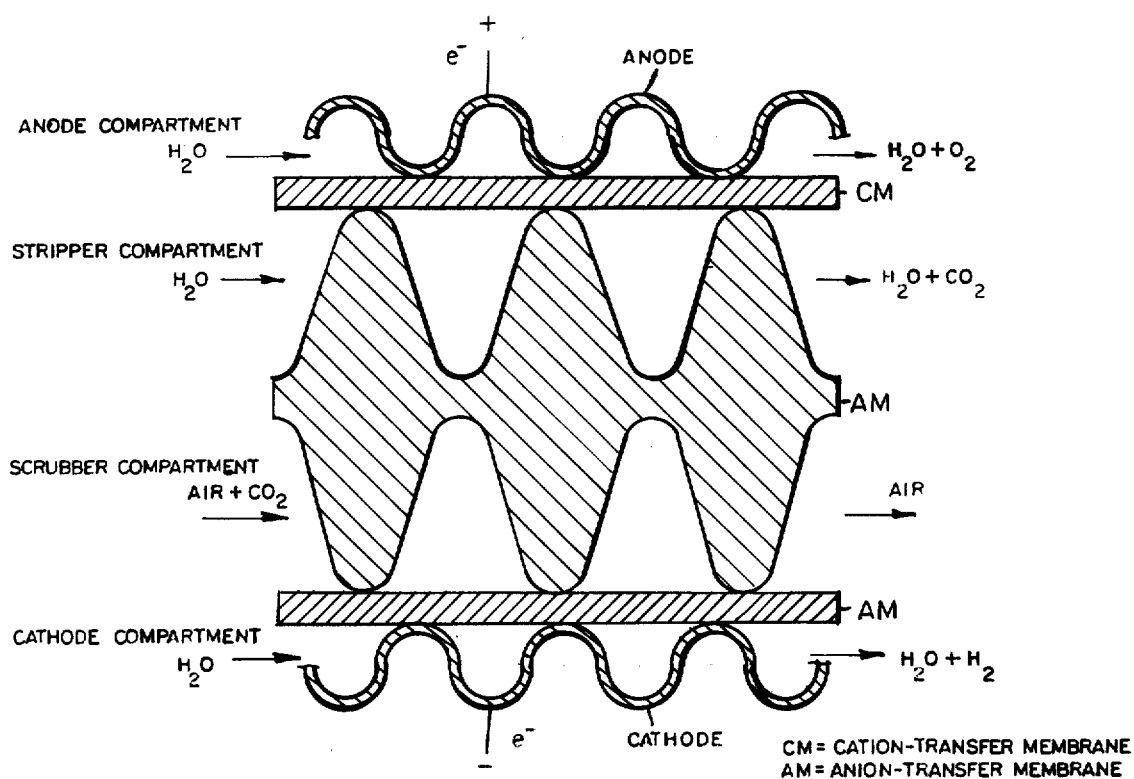
FIG. 3 shows graphically one alternative but electrochemically equivalent four compartment cell wherein the anode and cathode electrodes are embossed; the central membrane embossed and the other membranes are shown to be not embossed. The principles, flow courses, and chemical reactions are nevertheless the same as shown in FIG. 2.

Otherwise, the cell with its flow chambers and chemical reactions conforms to the basic principles as shown in FIG. 1 and FIG. 2 herein. The alternative but electrochemically equivalent arrangement of this cell (not shown) in accordance with the principles of flow and chemical reactions with relation to the scrubbing of a basic fluid is readily deducible from FIG. 3 in view of the differences pointed out in the description in relation to FIG. 4.

It should be understood that the drawings, forming part of this specification, disclose certain specific details of the invention for the purpose of explanation of broader aspects of the invention, but it is understood that the details may be modified in various aspects without departing from the principles of the invention and that the invention may be applied to other structures, e.g., other embossment designs, and gases or liquids other than the ones shown. Also, the drawings show four chamber cells or units with end electrodes therefor, but it is clear that many such units or cells could be combined into a stack arrangement when desired. In addition, alternative but electrochemically equivalent arrangements (such as the one shown in FIG. 3) could have various combinations of the membranes and electrodes embossed to provide an electrically conductive path without changing the inventive principles of the device.

The chemical reactions which take place in each of the four compartments of the systems shown in the drawings as applied to the electrolytic scrubbing of a $CO_2$ -air mixture may be identified in accordance with the following equations:

Cathode Compartment $$H_2O + e^- \rightarrow \tfrac{1}{2}H_2 + OH^-$$

This reaction probably occurs on the metal electrode side of the thin liquid film near and in the membrane-electrode (cathode) contact. The hydrogen gas formed is removed generally with the moisture from the cathode chamber; the $OH^-$ ions passing through the adjacent membrane (preferably an anion membrane) into the adjacent scrubber compartment as shown in the drawings:

Scrubber Compartment $$CO_2 + 2OH^- \rightarrow H_2O + CO_3^=$$

The $CO_3^=$ ions produced in the scrubber compartment in accordance with the above chemical reaction pass through the next membrane (preferably an anion exchange membrane) into the stripper compartment. The treated air having its carbon dioxide content reduced is withdrawn from the scrubber compartment for reuse.

In the case where a basic substance such as, for example, ammonia ($NH_3$) is to be removed in an apparatus such as that shown in FIG. 4, the following reaction takes place in the scrubber compartment which in that case is adjacent to the anode compartment and preferably separated from it by a cation exchange membrane.

$$NH_3 + H^+ \rightarrow NH_4^+$$

Stripper Compartment $$CO_3^= + 2H^+ \rightarrow H_2O + CO_2$$

or $$NH_4 + OH^- \rightarrow NH_3 + H_2O$$

In this compartment the carbonate ions from the scrubber compartment react with hydrogen ions generated in the anode compartment to regenerate gaseous $CO_2$ which is removed from the cell, discarded as waste as shown or otherwise processed. In this case the stripper compartments are adjacent to the anode compartments.

Similarly, the ammonium ions coming in from the scrubber react with the hydroxyl ions generated in the cathode compartment to generate ammonia gas which is removed. In this case the stripper compartments are adjacent to the cathode compartments.

Anode Compartment $$H_2O \rightarrow \tfrac{1}{2}O_2 + 2H^+ + 2e^-$$

In this compartment oxygen is generated and recovered for further use as desired. The hydrogen ions generated here pass into the stripper compartments or scrubber compartments as noted above, depending upon whether an acidic or basic substance is being absorbed.

It then becomes clear that the four compartments contain the following processes when applied to $CO_2$ removal.

1. Anode: generation of oxygen gas and liberation of $H^+$ ions;

2. Stripper: reaction of $H^+$ ions with $HCO_3^-$ and $CO_3^=$ ions to liberate gaseous $CO_2$;
3. Scrubber: removal of $CO_2$ from the fluid stream;
4. Cathode: generation of hydrogen gas and liberation of $OH^-$ ions into the scrubber compartment.

Other weakly acidic substances contemplated in the present invention include without limitation methyl mercaptan, hydrogen sulfide, sulfur dioxide, acetic acid, etc. Weakly basic substances include ammonia, amines, etc. The manufacture and properties of cation-permselective membranes are fully disclosed in U.S. Pat. Nos. 2,702,272; 2,730,768; 2,731,408; and 2,731,411; and of anion-permselective membranes, in U.S. Pat. Nos. 2,730,768; 2,800,445; and 2,860,097. Anion-selective membranes contain a high number of fixed positive charges such as quaternary ammonium groups and as such are permselective to the passage of negatively charged anions. An example is the material available under the trade name "Nepton AR 111." Cation-selective membranes contain a high number of fixed negative charges such as sulfonates and as such will allow the selective passage of positively charged ions there through. An example of a commercially available cation membrane is the material sold under the trade name "Nepton CR 61." It should be noted that embossed ion exchange membranes are known per se in the prior art. The embossing procedure used in the shaping of the same is disclosed in copending U.S. Pat. application Ser. No. 580,914 filed on Sept. 21, 1966 in the name of Frank B. Leitz, Jr.

It is apparent that variations of the apparatus and process can be employed to carry out the purpose of this invention. For example, if a single pass of the fluid feed mixture through one multi-cell unit did not remove the required amount of the desired component, a series of multi-cell repeating units could be used. This is particularly important when in an operation, it is desired to remove substantially all of a particular component from a fluid mixture containing a relatively concentrated amount of said component. It is therefore advantageous to provide a plurality of multi-cell units, each of said units connected in series by conduits with the effluent conduit of the scrubber compartments of one unit being connected to the influent conduit of the scrubber compartments of the next adjacent unit and so on. The gaseous feed mixture would then flow in series through each unit or stage removing in a single stage a portion of the component from the fluid feed mixture. Also, a single multi-cell unit can be employed in which the feed mixture is recycled or recirculated therein until the required degree of removal is attained. Another variation would comprise placing separate multi-cell units physically head-to-head and tail-to-tail and replacing the two immediately adjacent electrodes with a single electrode of the same polarity. Thus, the single electrode would be common to the two adjacent units. In effect, a complex multi-cell unit is constructed comprising a number of multi-cell units, said complex unit being defined between a single pair of terminal electrodes, and each multi-cell unit being defined and separated from its next adjacent unit by either a common anode or a common cathode. The common electrode is shared between two multi-cell units so that both sides of the electrode are used in the electrolytic process. In operation, the effluent from the scrubber chambers of the first unit is fed into the corresponding influent conduits of the scrubber chambers of the next adjacent unit, and so on. This series of flow, from one unit to the next adjacent unit, continues throughout the complex unit finally emerging from the last multi-cell unit as separate waste and product streams. The use of common electrodes (which may be bipolar as well as unipolar) reduces the space requirements of the apparatus, and it also effects a substantial cost saving in electrode material.

Embossed ion exchange membranes are comprised of solvated ionexchange resins generally in sheet form which are usually reinforced and supported by inert woven fabric materials. Such membranes generally comprise about 30% fabric by weight, 40% resin, and about 30% solvent, the latter being uniformly dispersed throughout the resin. Embossed cation membranes are composed typically of cross-linked sulfonated polymers of styrene-divinylbenzene. Typical embossed anion membranes may be crosslinked styrene-divinylbenzene structures with quaternary ammonium salt groups attached thereto. Such coherent, homogeneous embossed structures are generally made by casting or molding thermosetting or thermoplastic resins between negatively embossed sheets of aluminum and most often with supporting backing materials such as Saran, Dynel, nylon, glass cloth and similar materials resistant to strong acids.

The prior art has attempted to fabricate embossed ion-exchange membranes by molding or casting the same from preshaped glass molds. This method has proven unsatisfactory for many reasons including the lack of flexibility of the glass; only a very limited number of embossment patterns could be made; the glass after use was most difficult to clean for reuse; the glass was brittle and often cracked or broke altogether; the designs on pieces of glass were expensive to prepare and the glass often stuck tenaciously to the membrane material. However embossed membranes may be prepared in low yields by such manner and have been found to be entirely satisfactory in this present invention. However, a preferred procedure uses flexible or pliable metal foils, such as aluminum foil in place of the glass. This offers increased simplicity of production, dependable methods of membrane casting, greater availability of patterns, and far more economical advantages for the production of embossed ion-exchange membranes.

The embossed membrane made by the above process take the form of a corrugated membrane having preferably an interrupted herringbone pattern and a substantially flat margin sealing or gasketing area. Other than the sealing areas both surfaces of the remaining area are embossed with a plurality of projections and receding portions. The receding portions are so arranged as to form fluid flow channels. It is also apparent that many and various geometric designs, such as ribs, studs, ridges and the like, may be provided on the surface or surfaces of the ion-exchange membranes.

When the elements comprising the electrolytic cell are assembled into a fluid-tight stack arrangement, the tips of the projecting portions of the membrane, whether embossed on one side only or two sides, will press against the flat surface or tips of each adjacent membrane or electrode which causes electrical contact to form a continuous ion-conducting bridge between the pair of end electrodes. This arrangement will allow an electric current to be carried between electrodes, primarily by mobile ions of one sign or the other, passing through each membrane structure.

It will be apparent that the forms and shapes of embossed membranes may be designed almost without limit but the procedural steps for making the same as described hereinabove remains essentially the same.

The following examples are illustrative of the practice of this invention and are not intended to be limiting:

EXAMPLE I

An electrodeionization unit of the design of FIG. 2 and comprising 6 four compartment cells was used to remove carbon dioxide from a mixture thereof with air. The cathodes were made of stainless steel 304 and the anodes of platinum plated niobium. The cation exchange membranes were sulfonated copolymers of styrene and divinylbenzene reinforced with a woven spun acrylic fabric having a weight of 6 ounces per square yard. The embossments on the membranes were in the form of ridges 30 mils high and 0.5 inches long. There were 7.5 ridges per inch, the long axes of the ridges being paralled to the direction of fluid flow. The anion exchange membranes were chloromethylated and trimethylaminated copolymers of styrene and divinylbenzene, the embossed anion membranes having the same pattern as the cation membranes. The gas feed mixture, containing 0.6 volume percent of carbon dioxide was humidified by bubbling through distilled water and then directed in parallel flow to the six absorber (scrubber) chambers at a total influent flow rate of about 4 liters per minute. Simultaneously distilled water was circulated through the anode and cathode compartments. The unit was operated at a current density of 15 milliamperes per square inch of membrane area. At steady state conditions the effluent gas stream was analyzed for carbon dioxide using a "Lira" infrared analyzer. The results showed that the carbon dioxide content of the gas was reduced from about 0.6 volume percent to about 0.2 volume percent at a current efficiency of about 85 percent.

EXAMPLE II

An electrodeionization unit of the general design of FIG. 4 and comprising 6 four compartment cells was assembled. The anodes and cathodes were foils of platinum which has been embossed on the mother mold with the same pattern used for the membranes. The membranes had the embossment pattern used in Example I. The cation membranes adjacent to the anodes were embossed only on the sides facing the cathodes and the anion membranes adjacent to the cathodes were embossed only on the side facing the anodes. The central membrane was not embossed. The electrode compartment gasketing spacers were selected to permit good contact between the embossments on the electrodes and the adjacent non-embossed membrane surfaces. A gas feed mixture of ammonia and nitrogen substantially saturated with water was passed through the scrubber chambers at a rate of 2.5 liters per minute. Distilled water was circulated through the electrode compartments. A current density of 15 milliamperes per square inch was used. At steady state conditions, the ammonia content of the feed gas was reduced from about 0.6 volume percent to about 0.25 volume percent at a current efficiency of about 90 percent.

EXAMPLE III

The unit having the configuration of Example I was used to sorb methyl mercaptan from liquid isooctane. All the anion membranes were embossed only on the surfaces facing the interior of the scrubber compartments. The cation membranes and the electrodes were not embossed. The isooctane contained 0.01 percent methyl mercaptan by weight of suspended water into the absorber (scrubber) compartments. A 0.1 normal solution of sodium sulfate was employed as a flushing liquid in the electrode and stripper compartments. The unit was operated at a current density of 15 milliamperes per square inch. The flow rate of the isooctane was adjusted to give a product containing about 0.003 percent methyl mercaptan. The current efficiency was about 60 percent.

What is claimed is:

1. Apparatus for separating weakly ionizable substances from fluid mixtures containing the same comprising a pair of electrodes defining an electrolytic unit on its outer ends, three ion exchange membranes between said electrodes defining four compartments, the first and second of said membranes being of a like charge type and different from the charge type of the third membrane, said like charge membranes being adjacent to one another and to the electrode of the opposite charge sign, embossments on at least one of said membranes of like charge, said embossments contacting the other of said membrane of like charge thereby providing a current path from one of said membranes of like charge to the other and defining fluid passage means in the scrubber compartment defined by said like charged membranes, means for passing fluid into and out of said fluid passage means, means for providing electrical current continuity in the remaining compartments and means for passing a direct electric current between said electrodes transversely through said membranes and compartments.

2. The apparatus of claim 1 having the centrally located said second membrane and the anode and cathode electrodes non-embossed, the said first and third membranes being embossed on both surfaces and wherein all of the said elements contact the next adjacent element to form an electrical conducting bridge for passage of direct current from electrode to electrode.

3. The apparatus of claim 1 having the centrally located said second membrane embossed on both surfaces and wherein some of said embossments make direct contact with said adjacent first and third membranes.

4. The apparatus of claim 1 characterized in that at least one of said electrodes is embossed.

5. The apparatus of claim 1 characterized in that the embossed membranes are corrugated in design.

6. The apparatus of claim 1 characterized in that a plurality of said four compartment units are arranged a repeating array in order to provide a multi-unit high-capacity scrubber device.

7. A method of separating a weakly ionizable substance from fluid mixtures containing the same comprising passing said fluid mixture in the presence of moisture through a scrubber compartment of a four compartment electrolytic unit, said unit defined on its outer ends by anode and cathode electrodes, three ion exchange membranes between said electrodes defining said four compartments, the first and second of said membranes being of a like charge type and different from the charge type of the third membrane, said like charged membranes being adjacent to each other and to the electrode of the opposite charge sign, said membranes of like charge thereby forming a scrubber compartment there-between, embossments on at least one of said membranes of like charge, said embossments contacting at least the other of said membrane of like charge thereby providing a current path and a fluid passage through said scrubber compartment, passing water through the anode and cathode compartments, passing a direct electric current between the electrodes transversely through all four compartments, removing at least part of said weakly ionizable substance from the stripper compartment defined between the membranes of unlike charge and removing at least a partially purified fluid mixture from the scrubber compartment defined between the membranes of like charge.

8. The method of claim 7 wherein the weakly ionizable substance of the fluid mixture is acidic and wherein said ion-exchange membranes of like charge are anion selective.

9. The method of claim 7 wherein the fluid mixture is air with excess $CO_2$ therein.

10. The method of claim 8 wherein the weakly ionizable substance is hydrogen sulfide.

11. The method of claim 8 wherein the weakly ionizable substance of the fluid mixture is mercaptans.

12. The method of claim 7 wherein the weakly ionizable substance of the fluid mixture is basic and wherein said ion-exchange membranes of like charge are cation selective.

13. The method of claim 12 wherein the fluid mixture includes ammonia as the weakly ionizable basic substance.

* * * * *